United States Patent [19]

Ohsuga et al.

[11] Patent Number: 5,572,965
[45] Date of Patent: Nov. 12, 1996

[54] INTAKE PIPE FOR INTERNAL COMBUSTION ENGINE

[75] Inventors: Minoru Ohsuga; Jun'ichi Yamaguchi, both of Hitachinaka; Ryoichi Komuro, Hitachi; Yasushi Sasaki, Urizura-machi; Teruhiko Minegishi, Hitachinaka, all of Japan

[73] Assignees: Hitachi, Ltd., Tokyo; Hitachi Automotive Engineering Co., Ltd., Ibaraki, both of Japan

[21] Appl. No.: 432,073

[22] Filed: May 1, 1995

[30] Foreign Application Priority Data

May 9, 1994 [JP] Japan .................... 6-094899

[51] Int. Cl.⁶ ..................................... F02M 35/10
[52] U.S. Cl. .................. 123/184.42; 123/184.53
[58] Field of Search .................. 123/184.53, 184.55, 123/184.47, 184.42, 542

[56] References Cited

U.S. PATENT DOCUMENTS

| | | | |
|---|---|---|---|
| 4,679,531 | 7/1987 | Hitomi et al. | 123/184.42 |
| 4,819,588 | 4/1989 | Itoh et al. | 123/184.42 |
| 4,875,438 | 10/1989 | Suzuki et al. | 123/184.55 |
| 5,056,473 | 10/1991 | Asaki et al. | 123/184.55 |

FOREIGN PATENT DOCUMENTS

| | | | |
|---|---|---|---|
| 0523027 | 1/1993 | European Pat. Off. | 123/184.53 |
| 57-91365 | 6/1982 | Japan | 123/184.42 |
| 61-232324 | 10/1986 | Japan | 123/184.42 |
| 2-95723 | 4/1990 | Japan | 123/184.47 |
| 3-182623 | 8/1991 | Japan | 123/184.55 |
| 4-175465 | 6/1992 | Japan . | |

*Primary Examiner*—David A. Okonsky
*Attorney, Agent, or Firm*—Antonelli, Terry, Stout & Kraus

[57] ABSTRACT

An intake pipe for an internal combustion engine has an intake assembly to which the air supplied from an air cleaner flows in accordance with the opening of a throttle valve, and independent intake pipes receive the air in the intake assembly and distribute the air into each cylinder of the internal combustion engine. The intake passage between the air cleaner and the throttle valve assembly is arranged next to and separated by a partition wall from at least one of a negative pressure part of the intake passage downstream of the throttle vale, the intake assembly provided in the negative pressure part and the independent intake pipes, whereby two independent intake spaces are formed on either side of the partition wall.

15 Claims, 7 Drawing Sheets

INTAKE PIPE FOR INTERNAL COMBUSTION ENGINE

BACKGROUND OF THE INVENTION

The present invention relates to an air intake system for supplying the intake air and fuel to an internal combustion engine, and particularly to an air intake system for an internal combustion engine in which an intake assembly and independent intake pipes are provided along the passage of intake air to the cylinders of the engine.

Generally, an air intake system for an internal combustion engine is provided with an intake assembly, to which the air supplied from an air cleaner flows in accordance with the opening of a throttle valve, and independent intake pipes in which the air in the intake assembly is distributed to each cylinder of the internal combustion engine. In the intake system, the various members which constitute the intake system, such as an atmospheric pressure intake passage upstream of the throttle valve, a negative pressure intake passage or intake assembly on the down stream side of the throttle valve, independent intake pipes, etc., are connected in series. The intake system is relatively long, and so it has a disadvantage in that the utilization rate of the space in the engine compartment is low. In addition, the layout in the engine compartment is limited by other members.

This is disclosed in Japanese Patent Application Laid-open No. 4-175465 (1992), a construction in which the collector or intake assembly forming part of the negative pressure intake passage is disposed next to and separated by a partition wall from the independent intake pipes which communicate with each cylinder. However, in such a system, the passage from the air cleaner, which requires the largest occupied space, to the collector is placed at a position different from that of the unit including the collector and the independent intake pipes. Therefore, extra room is required, a large number of parts, such as attachment members for supporting the intake system members, are also required, and the arrangement has the disadvantage of being high in cost.

SUMMARY OF THE INVENTION

An object of the present invention is to provide an improved air intake system in which it is possible to efficiently place all parts and in which extra space is not required, so that it is possible to construct the whole intake system compactly.

Another object of the present invention is to provide a cheap and lightweight air intake system.

A further object of the present invention is to provide an air intake system in which the filling-up efficiency of the air-intake is extremely improved.

The intake system for an internal combustion engine according to the present invention basically has an intake assembly, to which the air supplied from an air cleaner flows in accordance with the opening of a throttle valve, and independent intake pipes through which the air in the intake assembly is distributed to each cylinder of the internal combustion engine. The intake passage between the air cleaner and the throttle valve is arranged next to and separated by a partition wall from at least one of the negative pressure part of the intake passage downstream of the throttle valve, the intake assembly provided in the negative pressure part, and the independent intake pipe, whereby two independent intake spaces are formed on either side of the partition wall.

More concretely, the intake air flows through the throttle valve in a vertically upward direction. Further, a switch axis of the throttle valve is directed in a direction perpendicular to the axes of the independent intake pipes. Further, a control unit is provided on a part of said intake assembly. In particular, either one of a control unit or a fuel injection valve may be incorporated in the air intake passage thereof between the air cleaner and the throttle valve assembly.

Further, the independent intake pipes are arranged next to and separated by a partition wall from the portion of the intake passage between the air cleaner and the throttle valve assembly, and from the negative pressure part of the intake passage downstream of the throttle valve or the intake assembly provided in the negative pressure passage.

Further, a chamber is provided in which communication channels corresponding to the number of the independent intake pipes are formed, and wherein the pitch of the opening portion on the side of the engine of the communication channels is matched to that of the intake ports. More specifically, the chamber has at least one of a fuel injection valve, a fuel passage, an air passage for causing the air to collide with the fuel and for producing fine particles, and means for producing a swirling air flow in the engine cylinder.

Further, a switching valve is provided in the partition wall between the independent intake pipes and the negative pressure air passage downstream of the throttle valve, and by operating the switching valve, the intake air passing through the throttle valve flows into-the independent intake pipes while by-passing the air intake assembly.

According to another aspect of the present invention, the air intake system for an internal combustion engine has an air intake assembly to which air supplied from an air cleaner flows in accordance with the opening of a throttle valve, and independent intake pipes through which the air in the intake assembly is distributed to each cylinder of the internal combustion engine. The air intake passage between the air cleaner and the throttle valve is arranged next to the independent intake pipes, and two independent intake spaces are formed by a partition wall which forms at least one part of the boundary between the intake passage and the independent intake pipes.

In particular, the air intake passage between the air cleaner and the throttle valve is arranged next to and is separated by the partition wall from either one of the negative pressure part of the intake passage downstream of the throttle valve or the intake assembly provided in the negative pressure part or the independent intake pipes, or it is arranged next to and separated by the partition wall from both of them. It is, therefore, possible to efficiently arrange the intake pipe, decrease any excess space, and compactly arrange the whole intake system. In addition, the number of parts, such as attachment members for supporting the intake system members, can be decreased, thereby, to economically construct the intake system as a whole.

DETAILED DESCRIPTION OF THE PREFERRED EMBODIMENTS

Figure 1:
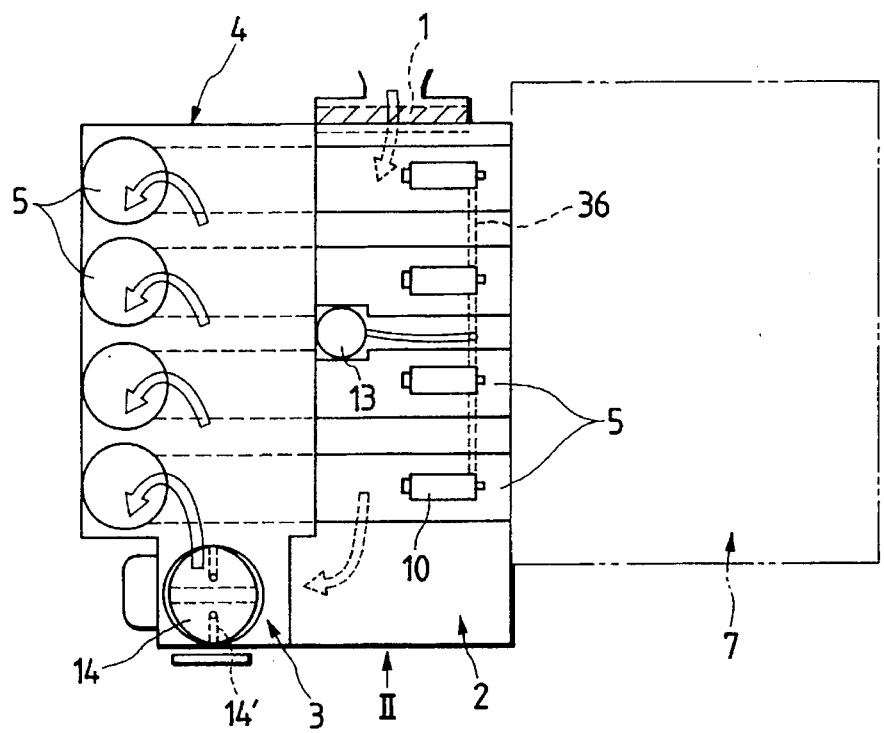
FIG. 1 is a simplified plan view of an intake pipe of an internal combustion engine according to an embodiment of the present invention.

Hereinafter, various embodiments of the present invention will be explained with reference to the drawings. In the drawings, like numerals designate like parts which have the same function.

Figure 2:
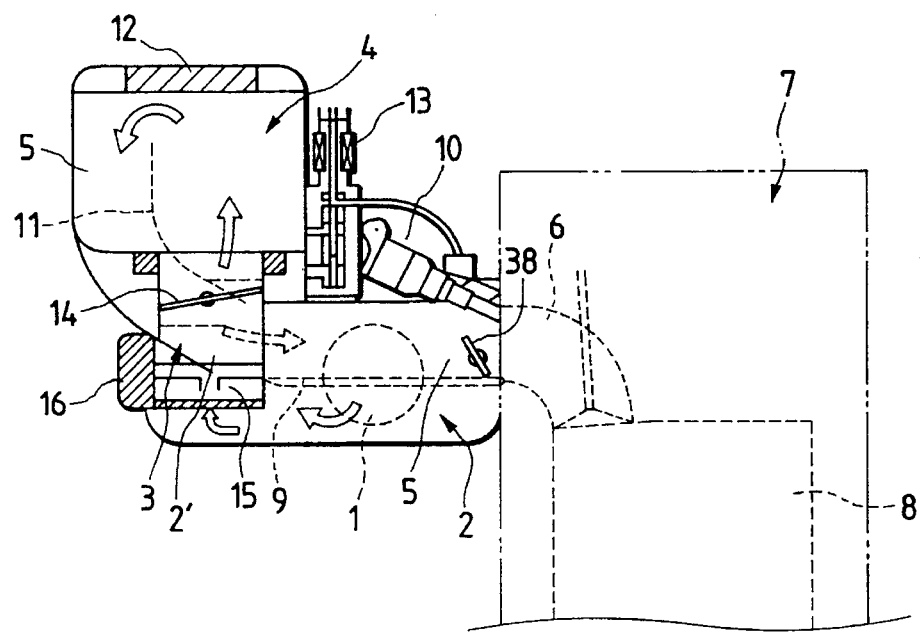
FIG. 2 is a simplified side view of the embodiment seen from the direction of the arrow II shown in FIG. 1.

FIGS. 1 and 2 show schematically an embodiment of an intake pipe of an internal combustion engine according to the present invention, in which the present invention is applied to a four-cylinder engine. FIG. 1 is a simplified plan view of the embodiment seen from above, and FIG. 2 is a simplified side view of the embodiment seen from the direction of the arrow II of FIG. 1.

In the air intake system as shown, an intake passage 2, between an air cleaner 1 and a throttle assembly 3, and a downstream portion of independent intake pipes 5 are arranged one above the other, being partitioned from each other by a partition wall 9. On the other hand, as seen from FIG. 1, the intake passage 2 and the upstream ends of the independent intake pipes 5 are arranged in planes perpendicular to each other. A portion 2' extending vertically is provided at the end of the intake passage opposite to the air cleaner 1, and a collector 4 is provided above the vertical portion 2'. The collector 4 and the independent intake pipes 5 downstream of the collector 4 are arranged next to each other and are partitioned from each other by a partition wall 11. In other words, the independent intake pipes 5 are arranged next to the collector 4, being separated therefrom by the partition wall 11, and also extend next to the intake passage 2 downstream of the air cleaner 1 above the partition wall 9.

Figure 13:
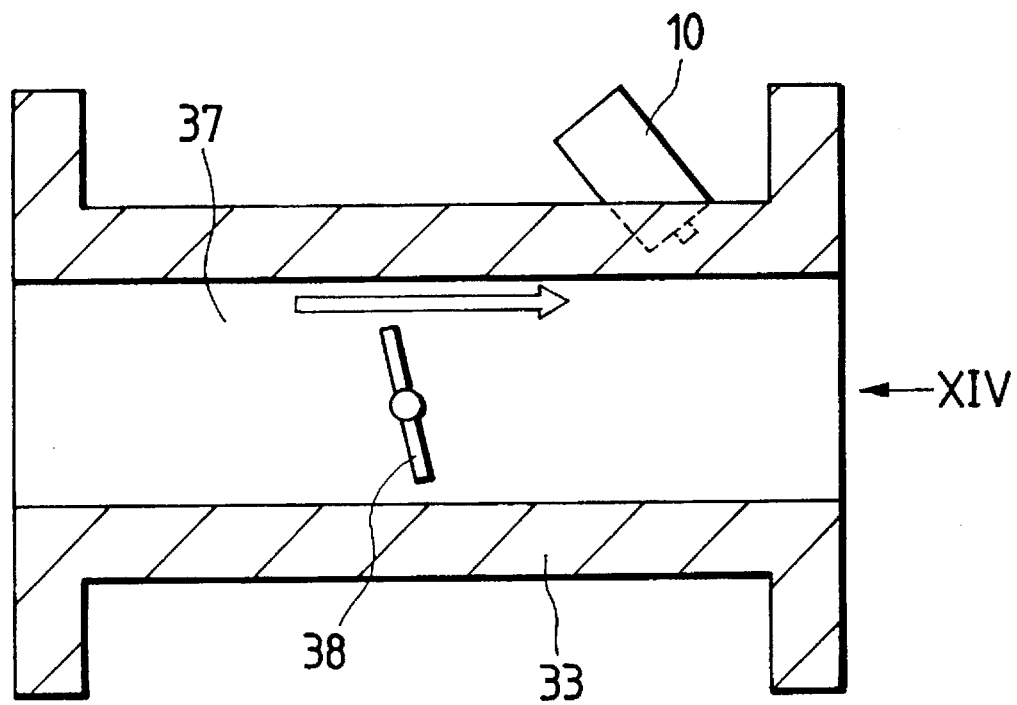
FIG. 13 is a side view of the embodiment in which a SCV is attached.
Figure 14:
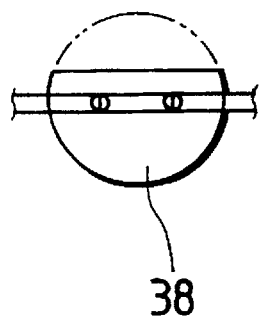
FIG. 14 is a view of the embodiment seen from the direction of the arrow XIV shown in FIG. 13.

A throttle valve 14 is provided within the passage of the vertical portion 2' of the intake passage 2, in which an axial direction of a switching axis 14' crosses the axes of the independent intake pipes 5 at right angles, and the intake air flowing through the throttle valve 14 passes upwardly from the intake passage 2 to the collector 4 via the throttle valve 14. Further, in the intake system as shown, a control unit 12 is provided on the upper portion of the collector 4 for controlling the engine 7. Also, an ISC (Idle Speed Control) valve 13 is provided on the vertical wall of the collector 4, above the intake passage 2, and controls the engine speed during idling operation using air flow which by-passes the throttle valve 14. The ISC valve 13 is provided with an assist air passage 36 which supplies air from the upstream side of the throttle valve 14 to the fuel injection portion of a fuel injection valve 10, which produces fine particles of injected fuel. An air flow meter 16 and an associated circuit are provided from the upstream side of the throttle assembly 3. Further, a SCV (Swirl Control Valve) 38, part of which is cut away, as shown in FIGS. 13 and 14, is provided in the neighborhood of the intake port 6 in the independent intake pipes 5. A swirling air stream is formed in the cylinder 8 due to the switching control of the SCV 38, whereby a mixing operation of the air and the fuel is promoted.

The air supplied to the engine 7 is received from the air cleaner 1 and supplied through the intake passage 2 to the throttle assembly 3. The air which passes through the throttle assembly 3 is supplied to the intake assembly or collector 4 provided in the negative pressure portion on the downstream side of the throttle valve 14, from the upper end portion of the vertical portion 2' of the intake passage 2. Further, the air from the collector 4 is introduced into the intake port 6 of the engine 7 through the independent intake pipes 5 connected to each cylinder, and thus air is supplied to each cylinder 8.

As described above, because an intake passage 2 between the air cleaner 1 and the throttle part 3 and the independent intake pipes 5 are arranged next to each other and are separated from each other by the partition wall 9, it is possible to decrease the space for installation. In addition, because the air flowing through the independent intake pipes 5 is cooled by air which enters from the air cleaner 1, the efficiency of the filling-up can be improved. Because each fuel injection valve 10 is arranged above a respective independent intake pipe 5, it is desirable to arrange the intake passage 2 under the independent intake pipes 5 from the point of view of providing a compact arrangement, so that the intake air will flow through the throttle valve 14 in an upward or vertical direction.

In the embodiment Shown in FIGS. 1 and 2, the control unit 12 is provided on top of the collector 4. Therefore, the electric wiring becomes short, with the result that the weight of the engine can be decreased.

Figure 3:
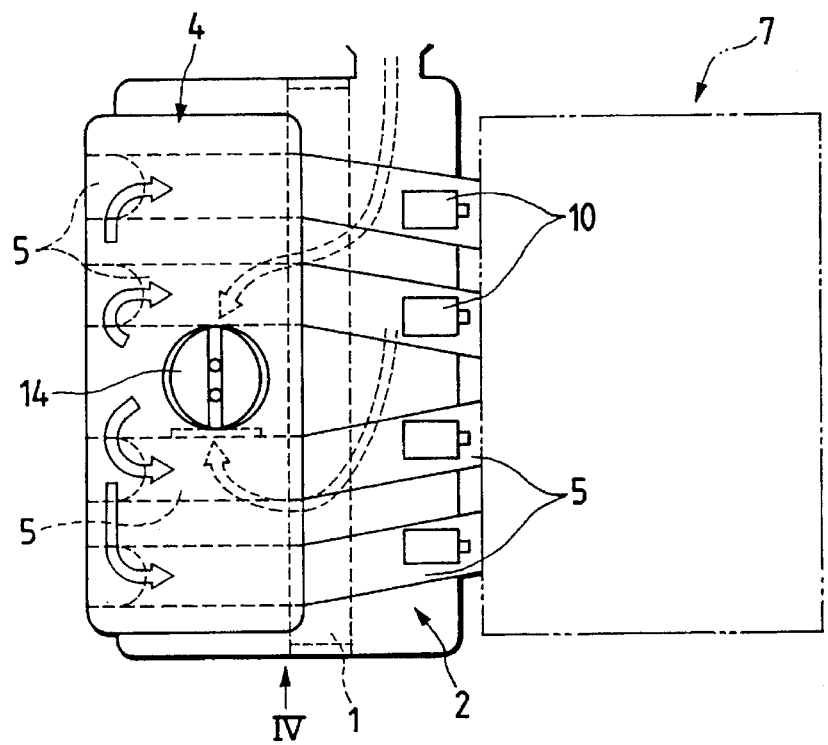
FIG. 3 is a simplified plan view of an intake pipe of an internal combustion engine according to another embodiment of the present invention.
Figure 4:
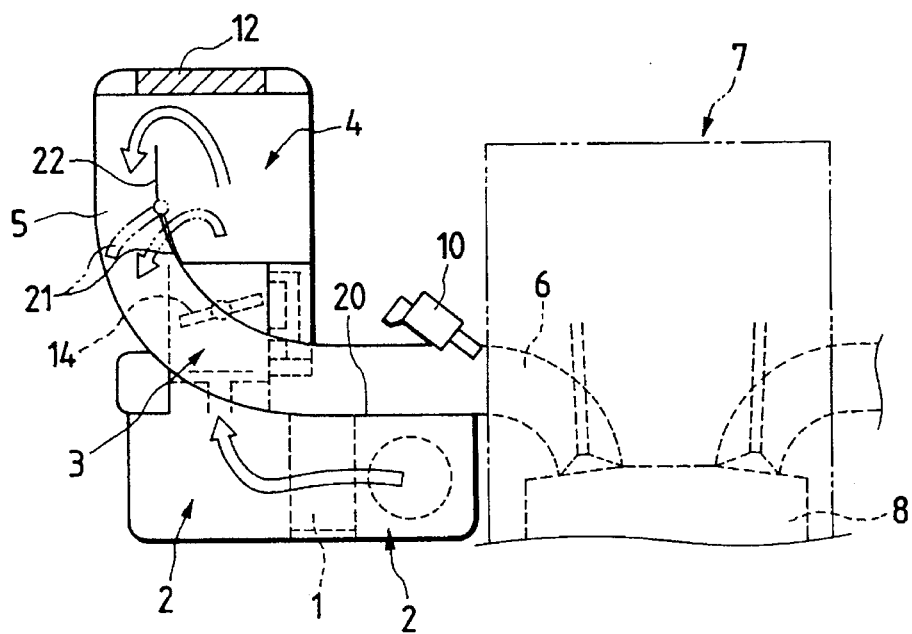
FIG. 4 is a simplified side view of the embodiment seen from the direction of the arrow IV shown in FIG. 3.

Next, FIGS. 3 and 4 show schematically another embodiment of an air intake system of an internal combustion engine according to the present invention, in which the present invention is applied to a four-cylinder engine. FIG. 3 is a simplified plan view of the embodiment seen from above, and FIG. 2 is a simplified side view of the embodiment seen from the direction of the arrow IV of FIG. 3.

In the present embodiment, the intake passage 2, provided at one end with an air cleaner 1, and the downstream portion of independent intake pipes 5 are arranged one above the other and are partitioned from each other by a partition wall 20. The collector 4 and the upstream portion of independent intake pipes 5 are arranged next to each other and are partitioned from each other by a partition wall 22. Further, a control unit 12 is provided in the upper portion of the collector 4.

In order to use the space in a more effective way than the previous embodiment, the throttle assembly 3 including a throttle valve 14 is arranged in the middle of a plurality of independent intake pipes 5, and the air cleaner 1 is provided within the intake passage 2 and extends in a longitudinal direction thereof.

In order to supercharge the intake air by using the inertia of the air, long independent intake pipes 5 are provided. Generally, it is known that the use of a long independent intake pipe will produce an inertia supercharge effect at a low engine speed, and that a short independent intake pipe will produce an inertia supercharge effect at a high engine speed. As seen in FIG. 4, a switching valve 21 is provided downstream of the inlet of each independent intake pipes 5, which makes it possible to switch between a long pipe and a short pipe length in accordance with the operating conditions. Namely, in the low engine speed range, the switching valve 21 is closed, as shown by the solid line in FIG. 4, and a long independent intake pipe 5 is formed in which the intake air passes through the collector 4 and is supercharged by the inertia. While, in the high engine speed range, the switching valve 21 is opened, as shown by the two-dot line in FIG. 4, and a short independent intake pipe 5 is formed in which the intake air does not pass through the collector 4. Accordingly, it is possible to obtain an inertia supercharge effect in a wide engine speed range.

Figure 5:
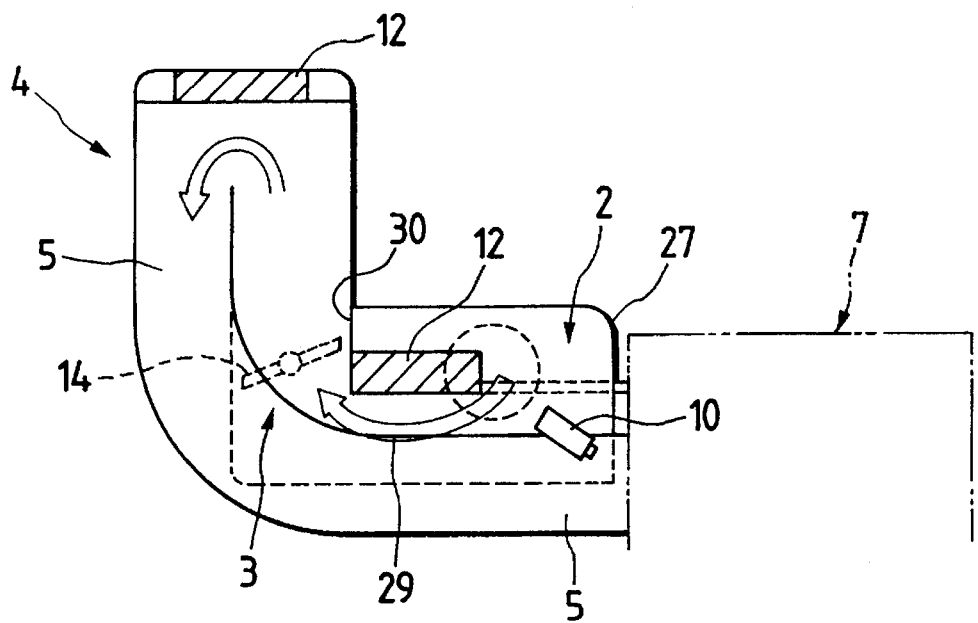
FIG. 5 is a simplified side view of an intake pipe of an internal combustion engine according to a further embodiment of the present invention.
Figure 6:
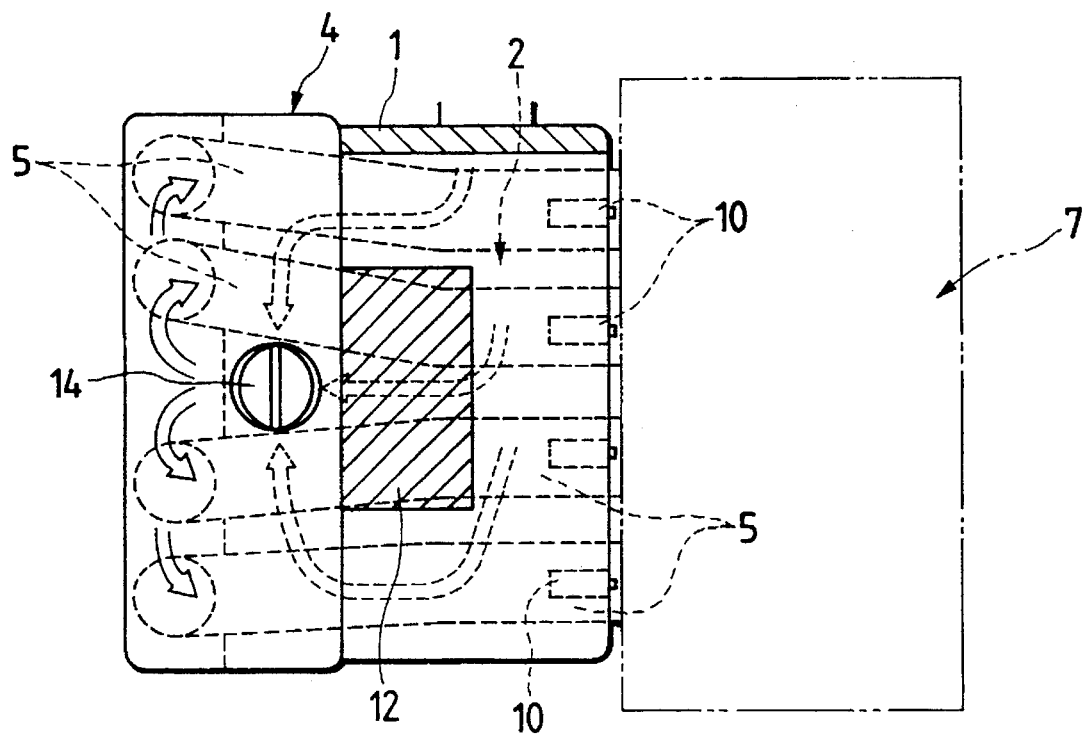
FIG. 6 is a simplified plan view of the embodiment of FIG. 5.

Next, FIGS. 5 and 6 show schematically a further embodiment of the intake pipe of an internal combustion engine according to the present invention, in which the present invention is applied to a four-cylinder engine. FIG. 5 is a simplified side view of the intake system, and FIG. 6 is a simplified plan view of the embodiment seen from above.

In this embodiment, the air cleaner 1 is provided in the entrance of the intake passage 2, which is provided above of the independent intake pipes 5. Accordingly, the space above the independent intake pipes 5 can be effectively utilized. Since the fuel injection valves 10 are generally arranged above the independent intake pipes 5, they are provided in the intake passage 2 on the upstream side of the throttle valve 14. Accordingly, it is possible to make effective use of the space above the fuel injection valve 14, thereby providing a compact intake system as a whole. Because the control unit 12 is arranged in the intake passage 2 upstream of the throttle valve 14, the control unit 12 is cooled by the cold air flowing through the intake passage 2. As shown also in FIG. 5, the control unit 12 may also be arranged on top of the collector 4 in a way similar to the previous embodiment. Further, a removable cover 27 forms the upper portion of the intake passage 2 to make it possible to obtain access to components in the intake passage. Accordingly, it is easy to attach or remove parts, such as the air cleaner 1, the control unit 12, fuel injection valve 10, etc., and it is possible to easily and quickly perform maintenance, such as the replacement of the parts.

In the air intake system as shown, the intake passage 2 upstream of the throttle valve 14 is arranged next to the downstream portion of the independent intake pipes 5, these components being partitioned from each other by a partition wall 29, while the upstream portion of the independent intake pipes 5 is arranged next to the collector 4 or the negative portion of the intake passage downstream of the throttle valve 14, being partitioned therefrom by a partition wall 30. By such a construction, excess space can be eliminated.

Figure 7:
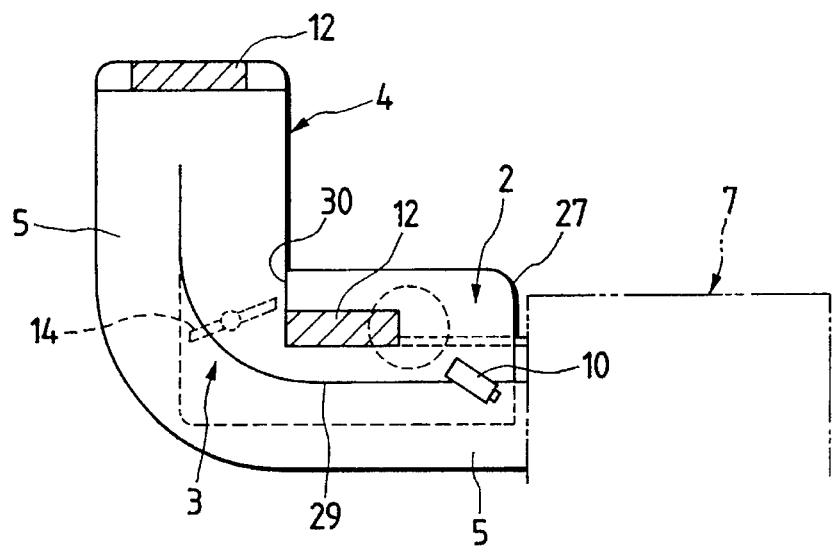
FIG. 7 is a simplified side view of an intake pipe of an internal combustion engine according to an embodiment of the present invention.
Figure 8:
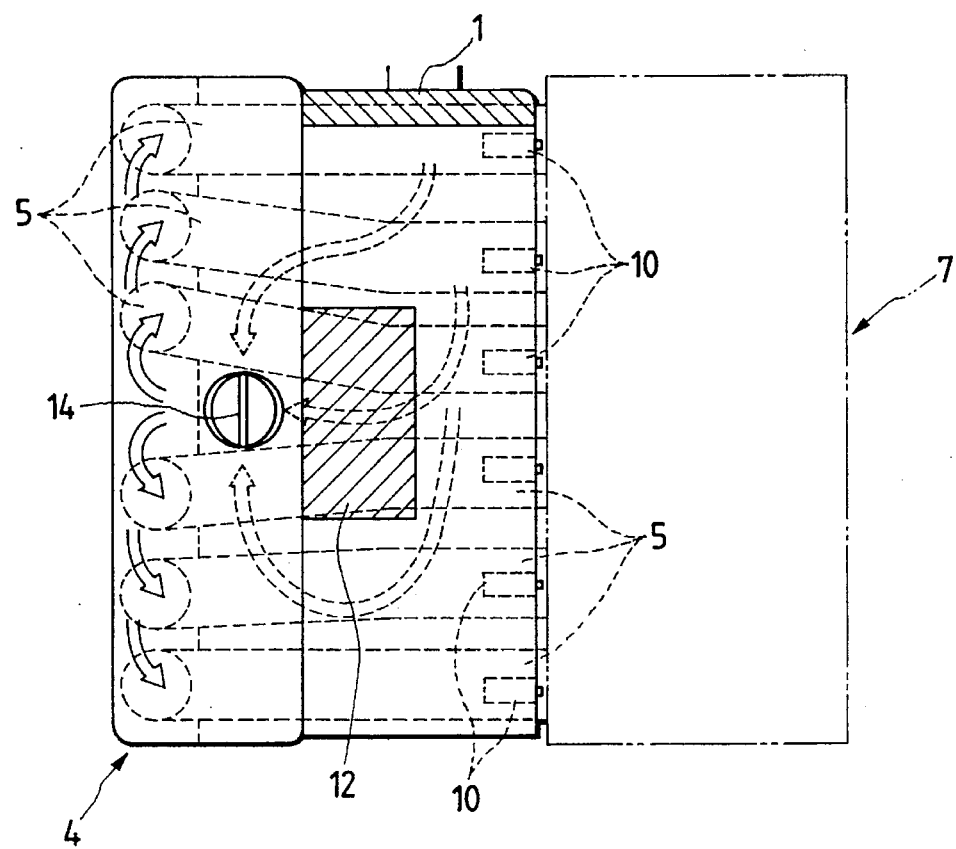
FIG. 8 is a simplified plan view of the embodiment of FIG. 7.

FIGS. 7 and 8 show schematically an intake pipe system of an internal combustion engine according to the present invention, in which the present invention is applied to a six-cylinder engine. FIG. 7 is a simplified side view of the intake system, and FIG. 8 is a simplified plan view of the embodiment seen from above.

As can be seen in FIG. 8, two additional independent intake pipes are provided to the embodiment shown in FIGS. 5 and 6. By such a construction, it becomes easy to apply the intake system to a serial type multi-cylinder engine.

Figure 9:
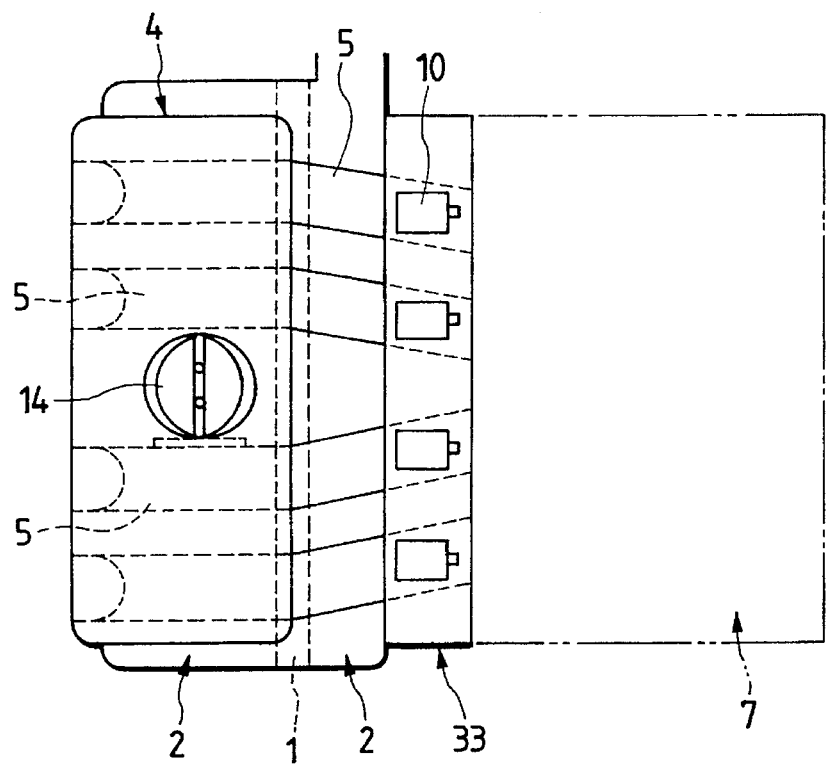
FIG. 9 is a simplified side view of an intake pipe of an internal combustion engine according to another embodiment of the present invention.
Figure 10:
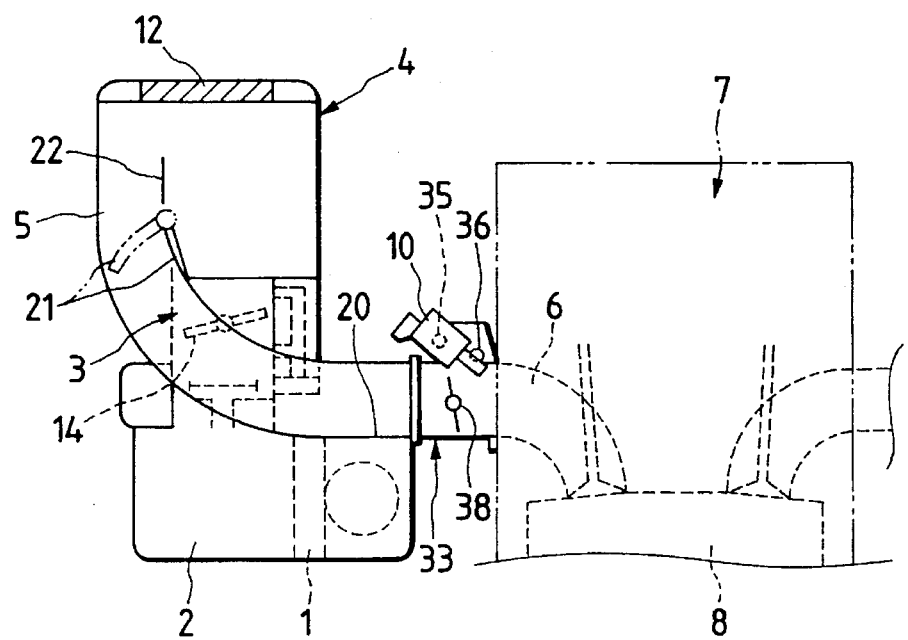
FIG. 10 is a simplified plan view of the embodiment of FIG. 9.

FIGS. 9 and 10 show schematically a further embodiment of the intake pipe system of an internal combustion engine according to the present invention, in which the present invention is applied to a four-cylinder engine. FIG. 9 is a simplified side view of the intake system, and FIG. 10 is a simplified plan view from above.

Figure 12:
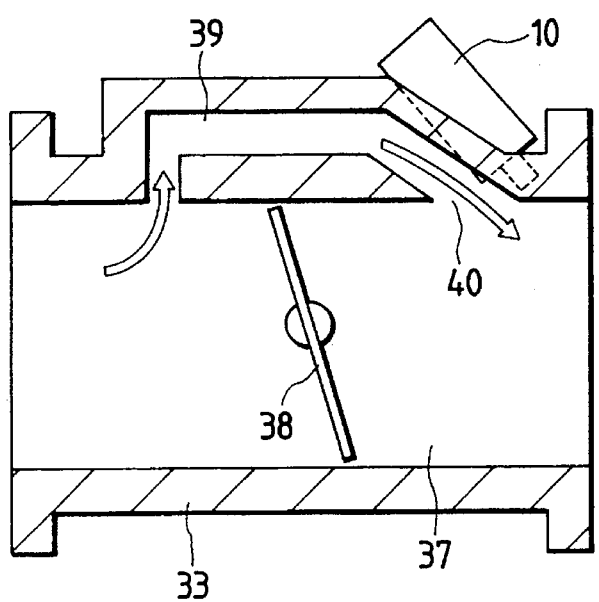
FIG. 12 is a view showing equipment for producing swirling air.

In the present embodiment, a new chamber 33 is provided between the engine 7 and the intake system. The chamber 33 is inserted and fixed between the engine 7 and the intake system, including the collector 4, as shown in the embodiment of FIGS. 3 and 4. The chamber 33 is provided with an assist air passage 36 for supplying air to the fuel injection valve 10, a SCV 38 for producing a swirling air flow in the cylinder 8, and so on. A portion of the valve 38 is cut away in order to deflect the air flow, as shown in FIG. 14, to provide a SCV. Another example of a way of producing swirling air is shown in FIG. 12, wherein a SCV 38 is provided in a communication passage 37 of the chamber 33 and a by-pass passage 39, by-passes the SCV 38. A directional air flow 40 produces swirling air in the cylinder.

Figure 11:
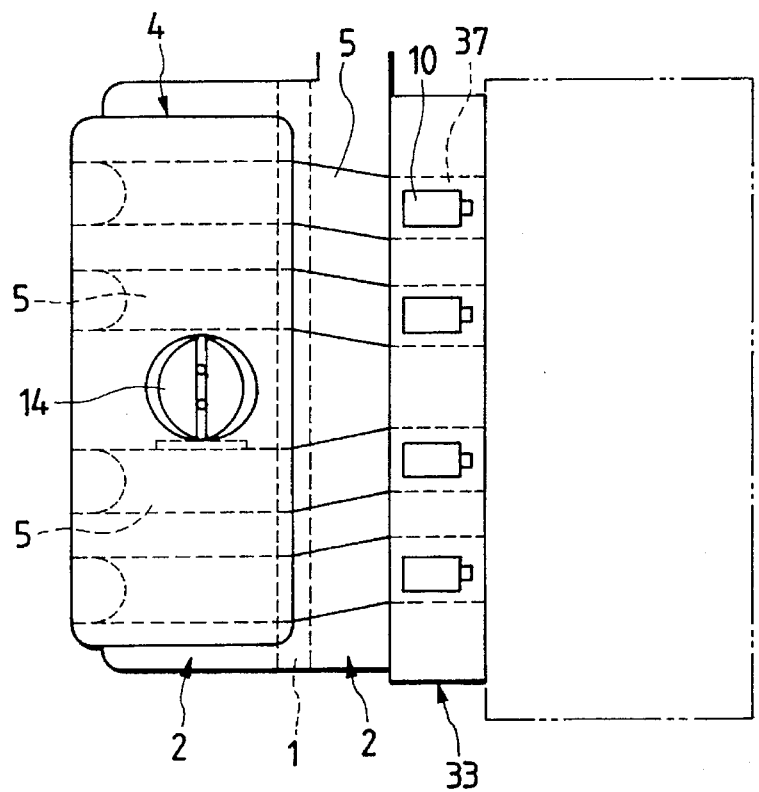
FIG. 11 is a simplified plan view to illustrate the operation of the intake system shown in FIG. 9.

If the present invention is applied to an engine in which the horizontal pitch of the cylinders 8 of the engine 7 is different, the pitch of the opening parts on the engine side of the communication passage 37 of the chamber 33 is formed so as to match that of the cylinders 8, as shown in FIG. 11. Namely, the chamber 33 is formed in such a way that the pitch of the opening parts on the intake system side of the communication passage 37 is matched to that of the independent intake pipes 5, and the pitch on the engine side is matched to that of the cylinders 8. On the other hand, if the pitch of the cylinders 8 is different from that of the intake port 6 of the engine head it is matched to the pitch of the opening part of the intake port 6 of the engine head. If the present invention is applied to a different kind of engine, it is possible to apply the present invention to the engine by matching the pitch of the opening parts of the communication passage 37 of the chamber 33 thereto. It is not required to change the construction of the intake system upstream of the chamber, and therefore, it is possible to apply the features of the invention to a variety of engines.

While the preferred embodiment of the present invention has been explained hereinbefore, many changes and variations of the disclosed embodiments of the invention may be made without departing from the inventive concept. For example, in FIGS. 5 and 6, while a six-cylinder engine having six independent intake pipes has been described, the present invention is not limited to a six-cylinder engine, but is applicable to any serial type multi-cylinder engine. Further, by adding independent intake pipes to the embodiments described above, it is possible to accommodate an engine having an increased number of cylinders.

Although FIGS. 9 to 11 show a construction in which a new chamber separated from the intake system is inserted between the cylinder of the engine and the intake system shown in FIGS. 3 and 4, it should be appreciated that it is possible to utilize this feature with the control members, such as the intake system and the fuel system, of the other embodiments described above.

We claim:

1. An air intake system for an internal combustion engine comprising: an intake assembly to which air supplied via an intake passage from an air cleaner flows in accordance with the opening of a throttle valve disposed in said intake passage, and independent intake pipes in which air in the intake assembly is distributed into each cylinder of the internal combustion engine, wherein the intake passage between the air cleaner and the throttle valve is arranged next to and is separated by a partition wall from at least one of a negative pressure part of the intake passage on the downstream side of the throttle valve, the intake assembly provided in communication with the negative pressure part and the independent intake pipes, whereby independent air intake spaces communicating with a path of the flow of air are formed on either side of the partition wall.

2. An air intake system for an internal combustion engine according to claim 1, wherein the intake passage is arranged such that intake air flows through the throttle valve in a vertically upward direction.

3. An air intake system for an internal combustion engine according to claim 1, wherein a switch axis of said throttle valve is directed perpendicular to at least one of said independent intake pipes.

4. An air intake system for an internal combustion engine according to claim 1, wherein a control unit is provided on a part of said intake assembly.

5. An air intake system for an internal combustion engine according to claim 1, wherein at least one of said control unit and a fuel injection valve is incorporated in the intake passage between said air cleaner and said throttle valve.

6. An air intake system for an internal combustion engine according to claim 1, wherein a downstream part of said independent intake pipes is arranged next to and separated by a first partition wall from the intake passage between the air cleaner and the throttle valve, and an upstream part of said independent intake pipes is arranged next to and separated by a second partition wall from the negative pressure part of the intake passage on the downstream side of the throttle valve or the intake assembly provided in communication with the negative pressure part.

7. An air intake system for an internal combustion engine according to claim 1, wherein a chamber is provided, between said independent intake pipes and said engine, in which communication channels are formed corresponding in number to the number of the independent intake pipes, and wherein the pitch of output ports of said communication channels is matched to the pitch of intake ports of the engine.

8. An air intake system for an internal combustion engine according to claim 1, wherein a switching valve is provided in the partition wall between said independent intake pipes and the negative pressure part on the downstream side of said throttle valve, so that by switching the switch valve, intake air which passes through said throttle valve will flow into the independent intake pipes while by-passing said intake assembly.

9. An air intake system for an internal combustion engine comprising: an intake assembly to which air supplied via an intake passage from an air cleaner flows in accordance with the opening of a throttle valve disposed in said intake passage, and independent intake pipes in which air in the intake assembly is distributed into each cylinder of the internal combustion engine, wherein the portion of the intake passage between the air cleaner and the throttle valve is arranged next to at least a portion of the independent intake pipes, independent air intake spaces communicating with a path of the flow of air being formed on either side of a partition wall forming at least one part of a boundary between the intake passage and said portion of the independent intake pipes.

10. An air intake system for an internal combustion engine according to claim 9, wherein a chamber is provided, between said independent intake pipes and said engine, in which communication channels are formed corresponding in number to the number of the independent intake pipes, and wherein the pitch of outlet ports of said communication channels is matched to the pitch of intake ports of the engine.

11. An air intake system for an internal combustion engine according to claim 9, wherein said chamber has at least one of a fuel injection valve, a fuel passage, an air passage for causing air to collide with fuel and for producing fine fuel particles, and means for producing a swirling air flow in an engine cylinder.

12. An air intake system for an internal combustion engine according to claim 9, wherein a switching valve is provided in the partition wall between said independent intake pipes and the negative pressure part on the downstream side of said throttle valve, so that by switching the switch valve, intake air which passes through said throttle valve will flow into the independent intake pipes while by-passing said intake assembly.

13. An air intake system for an internal combustion engine according to claim 9, wherein said portion of the intake passage between the air cleaner and the throttle valve and said portion of the independent intake pipes are arranged one above the other.

14. An air intake system for an internal combustion engine according to claim 13, wherein said intake passage is disposed between said independent intake pipes.

15. An air intake system for an internal combustion engine according to claim 13, wherein said intake passage is disposed above said independent intake pipes.

* * * * *